July 12, 1966
L. E. DAY
3,260,315
SPRING-TOOTH HARROW
Filed Jan. 7, 1965
3 Sheets-Sheet 1
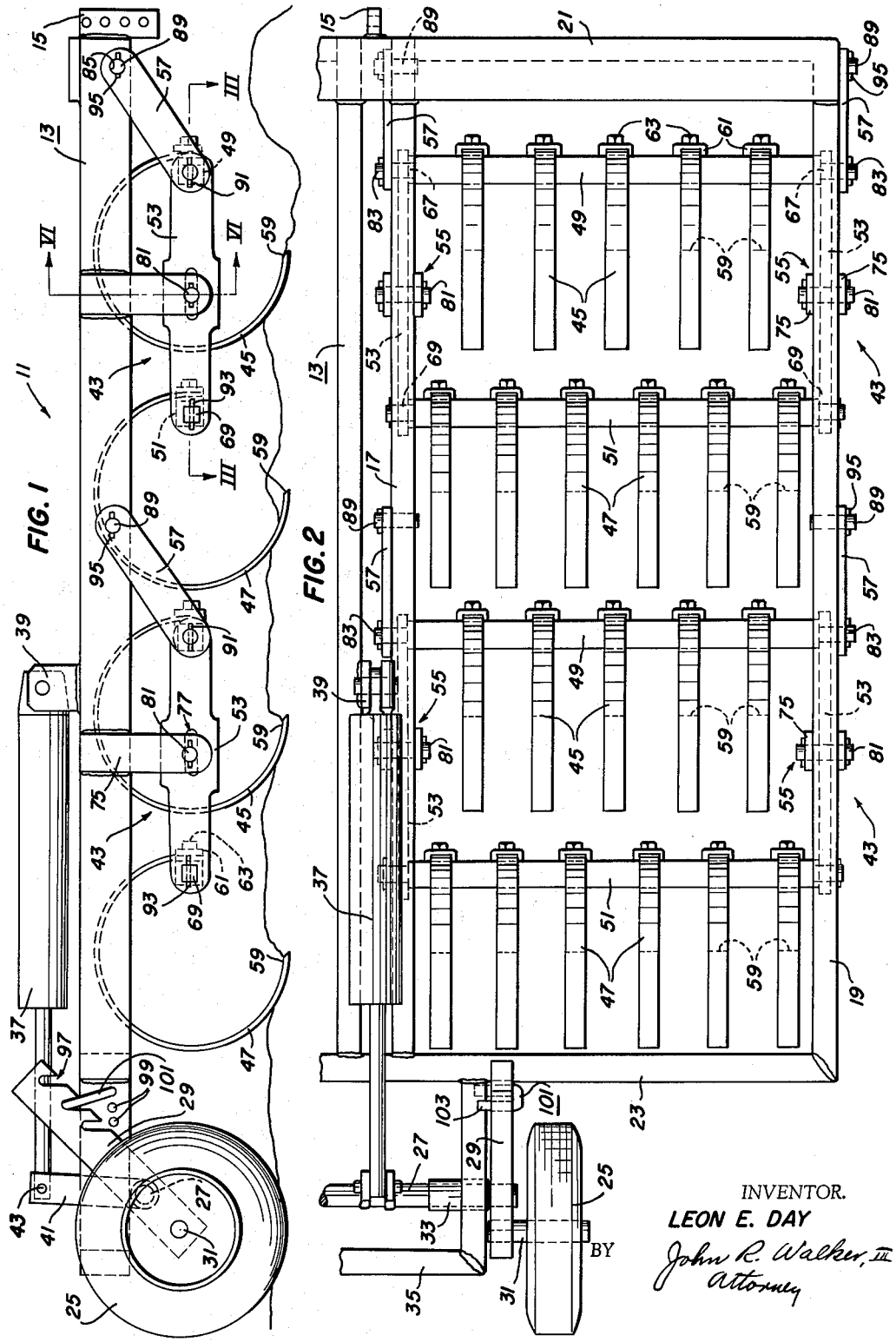
INVENTOR.
LEON E. DAY
BY John R. Walker, III
Attorney July 12, 1966  L. E. DAY  3,260,315
SPRING-TOOTH HARROW
Filed Jan. 7, 1965  3 Sheets-Sheet 2
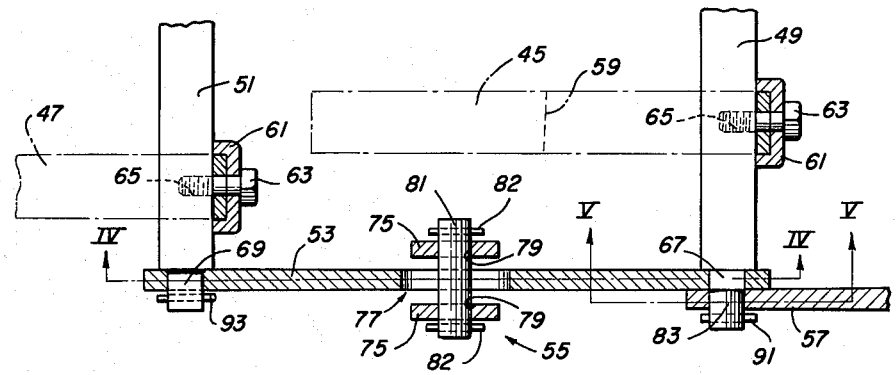
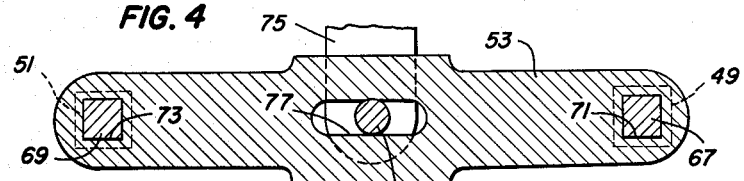
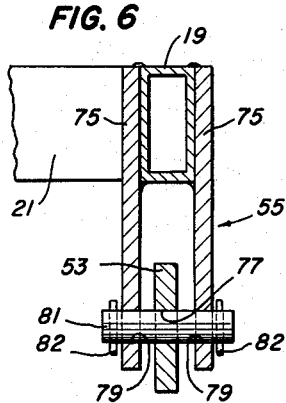
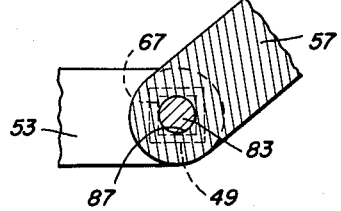
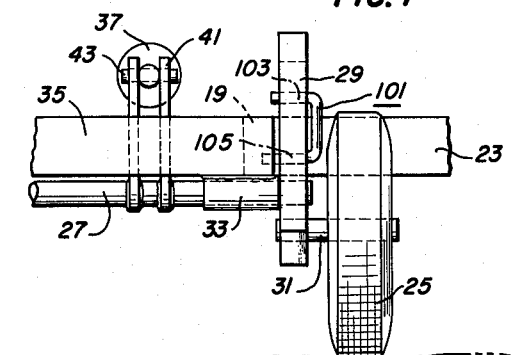
INVENTOR.
LEON E. DAY
BY John R. Walker III
Attorney

United States Patent Office 3,260,315
Patented July 12, 1966

3,260,315
SPRING-TOOTH HARROW
Leon E. Day, West Memphis, Ark., assignor of fifty percent to Callahan Industries, Inc., Memphis, Tenn.
Filed Jan. 7, 1965, Ser. No. 424,465
13 Claims. (Cl. 172—413)

This is a continuation-in-part of my co-pending application Serial No. 409,541, filed November 6, 1964, now abandoned. The invention relates generally to agricultural implements and particularly to a tractor-drawn spring-tooth harrow having a plurality of dual-ganged harrow units for tilling the soil.

Spring-tooth harrows of prior design have typically been provided with teeth which were securely mounted from the frame of the harrow. Harrow implements of such design function adequately if the ground being worked is substantially smooth or level and free from rocks or other such obstructions; however, in ground or field conditions wherein the ground is unlevel or in rows or where rocks, roots or other such obstructions exist, the typical spring-tooth harrow does not till the soil effectively. A spring-tooth harrow, in certain localities, is often used to smooth or level the rows of a row-crop field after the crop has been harvested, as, perhaps, for the subsequent planting of a pasture crop or a crop not planted in rows. The general practice in leveling or flattening the rows with a spring-tooth harrow is to pull the harrow transversely across the rows. The typical spring-tooth harrow, when pulled across the rows to level a field, often does not do a good job, and several trips must be made by the harrow implement and tractor over the same area in order to completely cover or erase the rows and to level the soil. The typical spring-tooth harrow, when used in the above-mentioned way and pulled transversely across the rows, does not engage the furrows between the rows. The result of the use of such prior harrow devices was ineffective tilling of the field.

The present invention seeks to overcome the above-mentioned objectionable features of prior spring-tooth harrow devices and has as its principal object to provide a harrow that is flexible and that, when pulled transversely across the rows of a field or over unlevel ground, will follow the contour of the rows or ground and will till the soil substantially to a uniform depth.

A further object is to provide a spring-tooth harrow device which operates effectively in rocky soil or soil having tree roots or stumps therein.

A further object is to provide a spring-tooth harrow implement having quickly and easily operable means for setting the implement or determining the depth at which the ground is to be tilled.

A further object is to provide a spring-tooth harrow having spring means for stabilizing the gangs of harrow teeth.

A further object is to provide a substantially simple spring-tooth harrow that does not include complicated or intricate structure which might malfunction, and to provide a strong and durable harrow implement.

A further object is generally to improve the design and construction of spring-tooth harrow implements.

The means by which the foregoing and other objects of the present invention are accomplished and the manner of their accomplishment will be readily understood from the following specification upon reference to the accompanying drawings, in which:

FIG. 1 is a side elevational view of the harrow implement of the present invention.

FIG. 2 is a fragmentary plan view, showing only the right half section or part of the harrow device.

FIG. 3 is a horizontal longitudinal sectional view taken as on the line III—III of FIG. 1.

FIG. 4 is a vertical longitudinal sectional view taken as on the line IV—IV of FIG. 3.

FIG. 5 is a vertical longitudinal sectional view taken as on the line V—V of FIG. 3.

FIG. 6 is a vertical transverse sectional view taken as on the line VI—VI of FIG. 1.

FIG. 7 is a fragmentarily shown rear view of the implement.

Figure 8:
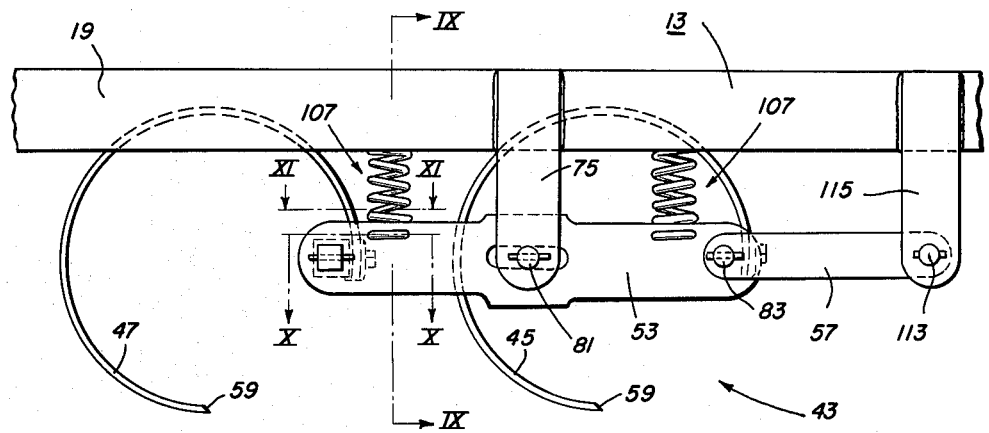
FIG. 8 is a side elevational fragmentary view of a modified form of the harrow implement.
Figure 9:
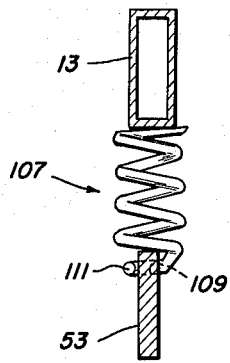
FIG. 9 is a vertical sectional view taken as on the line IX—IX of FIG. 8.
Figure 10:
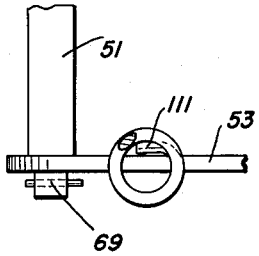
FIG. 10 is a horizontal sectional view taken as on the line X—X of FIG. 8.

Referring now to the drawings in which the various parts are indicated by numerals, the spring-tooth harrow of the present invention is indicated generally by the numeral 11. Harrow 11 is adapted to be drawn by a tractor, not shown, and includes a forward end, a rearward end, a right side, and a left side. FIG. 2 of the drawings shows only the right half of the device, and it is with reference to this half that the following description will be directed; it being understood, of course, that a left half of the device is included and is the counterpart of the right half shown.

Harrow 11 includes a frame, indicated generally at 13, a hitch 15 on the forward end of the frame, and ground engaging wheel means on the rearward end of the frame. The tractor, not shown, through hitch 15 and the wheel means of harrow 11, supports and moves frame 13 over the ground when the implement is in use.

Frame 13 may be constructed in any suitable configuration, although preferably it includes longitudinal members and transverse members perpendicularly joined to form a substantially rectangular structure. The longitudinal members preferably include an inside or left member 17 and an outside or right member 19, and the transverse members preferably include a front cross member 21 and a rear cross member 23.

The wheel means of the device principally includes a pair of wheels 25 (only one shown) movably secured from frame 13. Pair of wheels 25 are operable or pivotally movable together and are supported from frame 13 on a transverse shaft 27 (fragmentarily shown). Each of wheels 25 includes a support arm 29 disposed obliquely and including an upper end and a lower end. Each arm 29 is fixedly secured at the intermediate portion thereof respectively to the oppositely disposed end portions of transverse shaft 27. Stub axles 31 respectively of wheels 25 are perpendicularly affixed respectively to the lower end portions of arms 29 and journal the respective wheels 25 from arms 29. Transverse shaft 27 is turnably mounted from frame 13 in tubular bearings 33, as best seen in FIG. 7. The longitudinal members of the frame extension 35 of frame 13 securely mount tubular bearings 33. Turning transverse shaft 27 in a rearward or forward direction respectively raises or lowers frame 13. Fluid-actuated power means is provided for operably moving shaft 27 and preferably includes a piston-cylinder assembly 37. Piston-cylinder assembly 37 is preferably hydraulically operable and is connected through suitable control means to the hydraulic power means of the tractor. The base end of piston-cylinder assembly 37 is mounted from longitudinal frame members 17 by a suitable bracket 39. A paired-member arm 41 is affixed perpendicularly to transverse shaft 27. The piston rod of piston-cylinder assembly 37 is pivotally secured to arm 41 by a pin 43. Moving the piston rod of piston-cylinder assembly 37 outwardly or inwardly respectively raises or lowers frame 13.

Two dual-ganged harrow units, indicated generally by numeral 43, are mounted respectively from the right half section and the left half section of harrow 11. Harrow units 43 each include a first gang of spring-teeth 45 and a second gang of spring-teeth 47, as best seen in FIG. 2. The first and second gangs of teeth 45, 47 are fixedly secured respectively to a first transversely disposed bar 49 and a second transversely disposed bar 51. Right and left side members 53 secure first and second bars 49, 51 together. Bearing means, including right and left supports 55 pivotally secure side members 53 from frame 13. The pivot axis of each harrow unit 43 extends transversely of frame 13 and is disposed substantially half way between the respective first bar 49 and second bar 51 in parallel relationship therewith. A pair of link members, including a right and a left link member 57, articulatingly secure the respective side members 53 from frame 13. Link members 57 provide means for arresting the pivotal movement of the respective side members 53 and first and second gangs of teeth 45, 47.

The above description discloses somewhat briefly the general construction of each dual-ganged harrow unit 43 and the arrangement or mounting of the units from frame 13. It is thought fitting to mention now that the harrow units may be of various number, and that the four-unit harrow as shown and described will be for clarity and exemplification purposes only. The particular field conditions or tractor power available will determine substantially the size or number of harrow units of a certain harrow.

The teeth of first gang of spring-teeth 45 and second gang of spring-teeth 47 are alike and are circularly formed from rectangularly cross-sectioned strap metal. Gangs of teeth 45, 47 are of spring-tempered metal, and each tooth includes a chiseled-sharpened ground-engaging end and an end securely attached respectively to a first bar 49 or a second bar 51. Each tooth is secured respectively to a bar by a channel-shaped bracket 61 and a bolt 63. Threaded apertures 65 are provided respectively in first bar 49 and second bar 51. A bolt 63 extends through an aperture in each channel bracket 61 and the end portion of each tooth and is threadedly secured in an aperture 65. First and second gangs of teeth 45, 47 are individually arranged and transversely spaced respectively along first bar 49 and second bar 51. Preferably, one bar is provided with one more tooth than the other bar, and the first and second gangs of teeth 45, 47 are staggered, one gang relative to the other gang. Each circular tooth extends from its mounting upwardly, rearwardly, downwardly and forwardly in the usual manner of spring-teeth for harrow devices. The extension of each tooth, or the circular size thereof, is of considerable importance to the overall effectiveness of the harrow implement. Each tooth extends substantially three-quarters of a circle, and the chisel-shaped end portion 59 of each tooth preferably lies substantially in a vertical and diametric plane passing through the center of revolution or development of the tooth.

The right and left or oppositely disposed end portions of first bar 49 and second bar 51 are provided respectively with square-sectioned and reduced shoulder portions 67, 69, as best seen in FIGS. 3 and 4. Square-bore apertures 71, 73 are provided respectively in the forwardly and rearwardly disposed end portions of right and left side members 53. The reduced shoulder portions 67, 69 respectively of first bar 49 and second bar 51 are loosely fitted respectively in apertures 71, 73 and prevent relative torsional movement of first and second bars 49, 51 and side members 53. The assembly or construction of side members 53 and first and second bars 49, 51 provides a semi-rigid structure of substantially rectangular configuration.

A support 55 for each of side members 53 is fixedly secured at the upper end portion thereof respectively to the left and right horizontal frame members 17, 19. Supports 55 each include paired leg members 75, as best seen in FIG. 6. Leg members 75 of each support 55 are alike and are fixedly secured respectively on oppositely disposed sides of the respective left and right longitudinal frame members 17, 19 and at the lower end portions thereof, astraddle a respective side member 53. Slotted apertures 77 are provided respectively in right and left side members 53. Apertures 77 are centrally arranged and extend longitudinally and horizontally in the respective side members 53. Aligned bore openings 79 are provided respectively through leg members 75 of supports 55. Two pins 81, extending respectively through slotted apertures 77 and bore openings 79 of right and left side members 53 and supports 55, pivotally secure the side members, first and second bars 49, 51, and first and second gangs of spring-teeth 45, 47 from frame 13. Cotter pins or fastening pins 82, extending respectively through oppositely disposed end portions of pins 81, prevent axial movement of pins 81 relative respectively to right and left supports 55. Slotted apertures 77 respectively in right and left side members 53 permit limited movement of the side members and first and second gangs of teeth 45, 47 relative to frame 13, which movement will be described in more detail later in the specification.

Right and left link members 57 are articulatingly secured to first bar 49 and frame 13. Cylindrical pivot portions 83, extending outwardly of the oppositely disposed square-sectioned shoulder portions 67 of first bar 49, are provided. Right and left link members 57 are respectively provided at the oppositely disposed end portions thereof with cylindrical bore openings 85, 87. Pivot portions 83 of first bar 49 extend respectively through bore openings 87 of right and left link members 57. Anchor pins 89 are fixedly secured respectively to right and left longitudinal frame members 17, 19, as best seen in FIG. 2. Link members 57 are secured to anchor pins 89 with the anchor pins extending respectively through bore openings 85 of the link members. The right and left link members 57 are thus respectively pivotally connected on one end thereof to frame 13 and pivotally connected on the other end thereof respectively to pivot portions 83 of bar 49 and to the forward end portions of right and left side members 53. Fastening pins 91, 93 are provided and extend respectively through the oppositely disposed end portions of first bar 49 and second bar 51 for respectively securing side members 53 to the first and second bars. Fastening pins 91 extend respectively through oppositely disposed pivot portions 83 of first bar 49. Pins 91, in addition to securing the respective side members 53, also axially secure the respective link members 57 to first bar 49. Fastening pins 95, extending respectively through anchor pins 89, respectively secure the right and left link members to the right and left anchor pins.

The depth of soil penetration by the teeth of the respective harrow units 43 is determined substantially by the disposition of the support wheel means at the rearward end of the implement. As mentioned previously, the depth of penetration may be controlled by the tractor operator by controlling the movement of piston-cylinder assembly 37. Often, and when it is not desired to control the depth of penetration of the harrow units hydraulically, a fixed disposition of the wheel means may be desired. To provide a fixed disposition of the wheel means, support wheels 25 are fixedly journaled relative to frame 13. The structure for accomplishing this preferably is as follows: The upper portion of support arm 29 is provided with a plurality (three shown) of downwardly extending and obliquely formed slots 97 in the upper portion of the arm. A plurality of holes 99 are provided and extend horizontally through the longitudinal member of frame extension 35. A U-shaped rod 101 is provided and includes parallel upper and lower end portions 103, 105, respectively. To fixedly secure the wheel means at a selected setting, the following simple procedure is carried out: First, piston-cylinder assembly 37 is actuated to move the piston rod outwardly and to rearwardly move and turnably raise the upper portion of support arm 29. Next, the upper and lower end portions 103, 105 of rod 101 are placed respectively in a selected slot 97 and in a selected hole 99. Then, after the hydraulic pressure is released from piston-cylinder assembly 37, wheels 25 are fixedly positioned relative to frame 13, and a desired setting or depth of soil tillage is afforded.

The harrow implement of the present invention is flexible and follows the contour of the rows or ground. The pivotally-acting first and second gangs of teeth of each harrow unit move up and down and till the soil to a uniform depth. Thus, for example, if tilling across the rows, when the first gang of teeth 45 encounters a row or a raised place in the soil, they will be forced upwardly to cause side members 53, and the parts rigidly connected thereto, to pivot counterclockwise, as viewed in FIG. 1, about a transverse axis coincident with the axis of pin 81, which pivoting movement will carry the second gang of teeth 47 downwardly to maintain proper tilling engagement with the soil. Then, when going down the other side of the row, the second gang of teeth 47 will be forced upwardly to cause clockwise movement, that is, the opposite movement of that hereinabove described, so that the first gang of teeth 45 will be moved downwardly to maintain proper tilling engagement with the soil. It will be understood that the first and second gangs of teeth 45, 47, bars 49, 51, and side members 53 are pulled along by link members 57, and that the slotted apertures 77 permit the heretofore described pivoting. Otherwise, if aperture 77 was not elongated or slotted, the distance between pin 81 and pivot portion 83 would be fixed, so that this fixed distance, together with the fixed distance between pivot portion 83 and anchor pin 89, would not permit any pivoting movement of side members 53 about pivot portion 83. Also, another and perhaps better description of the abovementioned pivoting movement and action of the parts is that it is a tandem type of action.

The modified form of the harrow implement is illustrated in FIGS. 8, 9, 10 and 11. In this form of the implement, spring means is provided for stabilizing the pivotal movement of the first and second gangs of spring-teeth for each of the dual-ganged harrow units.

A coiled compression-type spring 107 is disposed respectively at the forward end portion and at the rearward end portion of each right and left side member. The two forwardly disposed springs of the right and left side members and the two rearwardly disposed springs of the right and left side members counterbalance each other; that is, the two forwardly disposed springs and the two rearwardly disposed springs of each harrow unit 43 stabilize the pivotal movement of the harrow unit about the respective pair of pivot pins 81.

Each spring 107 is disposed vertically and includes an upper coiled portion and a lower coiled portion. Each spring 107 is securely attached at the lower coiled portion thereof to a respective right or left side member 53. The upper coiled portion of each spring 107 is unsecured and free, but compressively engages the bottom surface of the respective longitudinal member of frame 13.

Figure 11:
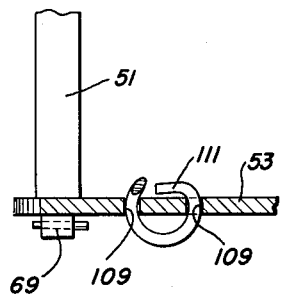
FIG. 11 is a horizontal sectional view taken as on the line XI—XI of FIG. 8.

The means for securing each of springs 107 respectively to side members 53 preferably is as follows: A pair of bore openings 109 is provided along the upper edge, respectively, of the forwardly and rearwardly disposed portions of each of side members 53. Each pair of openings 109 is positioned a short distance from the upper surface of the respective member 53, and the two openings of each pair of openings 109 are disposed apart a distance commensurate with the diameter of the coils of springs 107. The lower coiled portion 111 of each of springs 107 is threaded through the respective pair of bore openings 109, and is bent adjacent the side surface of the respective member 53, as best seen in FIG. 11.

The springs 107 are particularly advantageous when transporting harrow 11 with frame 13 in a raised position and with spring-teeth 45, 47 free of the ground. In the principal embodiment shown in FIGS. 1–7, for example, when the harrow was transported with frame 13 in a raised position, there was a tendency for the spring-teeth 45 or 47 to drag on the ground, particularly if the side members 53 were not balanced about the pins 81. However, with the modified embodiment of FIGS. 8–11, the springs 107 maintain side members 53 substantially horizontal when frame 13 is in a raised position so that teeth 45, 47 do not drag the ground, and yet, when the frame 13 is lowered into an operating position, the springs 107 permit the pivoting movement of side members 53, heretofore described relative to the principal embodiment, so that the harrow can follow the contour of the rows or ground.

It will be noted in FIG. 8 that, in the modified embodiment, the link member 57 is disposed in a substantially horizontal position and is pivotally mounted from frame 13 at pivot point 113 by a depending member 115 which is fixedly attached to member 19 and is a part of frame 13. It will be understood that, in either the preferred embodiment or the modified embodiment, the link member 57 can be mounted from frame 13 to pull at an angle, as best seen in FIG. 1, or can be mounted from frame 13 to pull horizontally, as best seen in FIG. 8.

The harrow implement of the present invention is not unduly affected by rocks or tree roots in the soil and operates effectively in such conditions. The support wheel setting or depth of tillage of the harrow implement may be variably controlled by the operator from the tractor seat, or the wheel setting may be fixedly secured at a desired position. In summary, the present invention provides a very practical harrow implement for cultivating or tilling the soil.

Although the present invention has been described in some detail by way of illustration and example for purposes of clarity or understanding, it is to be understood that it is not to be so limited since changes and modifications may be made therein which are within the full intended scope of this invention as hereinafter claimed.

I claim:

1. A spring-tooth harrow implement comprising a frame having a forward end and a rearward end, means for supporting and moving said frame over the ground, a dual-ganged harrow unit mounted from said frame; said harrow unit including a first transversely disposed bar, a second transversely disposed bar arranged rearwardly of said first bar, a first gang of spring-teeth with the teeth thereof being transversely spaced and fixedly secured to said first bar, a second gang of spring-teeth with the teeth thereof being transversely spaced and fixedly secured to said second bar, a pair of side members spaced transversely and extending longitudinally of said frame, and means fixedly securing said first bar to said second bar and said pair of side members; bearing means pivotally securing said pair of side members from said frame with the pivot axis thereof extending transversely of said frame and disposed substantially half-way between said first bar and said second bar whereby said first bar, said second bar, said pair of side members, said first gang of spring-teeth, and said second gang of spring-teeth are pivotable together about said pivot axis; and link means articulatingly securing said pair of members and said frame for pulling said pair of members while permitting limited pivotal movement of said harrow unit about said pivot axis.

2. A spring-tooth harrow implement comprising a frame having a forward end and a rearward end, means for supporting and moving said frame over the ground, a dual-ganged harrow unit mounted from said frame; said harrow unit including a first transversely disposed bar, a second transversely disposed bar arranged rearwardly of said first bar, a first gang of spring-teeth with the teeth thereof being transversely spaced and fixedly secured to said first bar, a second gang of spring-teeth with the teeth thereof being transversely spaced and fixedly secured to said second bar, a pair of side members spaced transversely and extending longitudinally of said frame, means securing said first bar and said second bar and said pair of side members, bearing means pivotally securing said pair of side members from said frame with the pivot axis thereof extending transversely of said frame and disposed substantially half-way between said first bar and said second bar, and link means articulatingly securing said pair of members and said frame for arresting the pivotal movement of said pair of members and said first and said second gangs of spring-teeth.

3. The combination of claim 2 in which is included spring means yieldably connecting said frame and said pair of side members for stabilizing the pivotal movement of said first and said second gangs of spring-teeth.

4. A spring-tooth harrow implement comprising a frame having a forward end and a rearward end, means for supporting and moving said frame over the ground, a dual-ganged harrow unit mounted from said frame; said harrow unit including a first transversely disposed bar, a second transversely disposed bar arranged rearwardly of said first bar, a first gang of spring-teeth with the teeth thereof being individually arranged and transversely spaced and fixedly secured to said first bar, a second gang of spring-teeth with the teeth thereof being individually arranged and transversely spaced and fixedly secured to said second bar, said gang of teeth of said first bar and said gang of teeth of said second bar being staggered transversely, a pair of laterally disposed side members spaced apart transversely and extending longitudinally of said frame, means securing said first bar and said second bar and said pair of side members in substantially perpendicularly arranged configuration, bearing means pivotally securing said pair of side members from said frame with the pivot axis thereof extending transversely of said frame and disposed substantially half-way between said first bar and said second bar, said bearing means including means providing limited forward and rearward movement of said pair of side members relative to said frame, and link means articulatingly securing said pair of side members and said frame for arresting the pivotal movement of said pair of side members and said first and said second gangs of spring-teeth.

5. The combination of claim 3 in which said link means of said harrow implement comprises a pair of elongated link members including a right member and a left member, means pivotally connecting an end of said right link member and an end of said left link member to said frame, and means pivotally connecting the other ends of said right and left link members respectively to said oppositely disposed end portions of said first bar.

6. In combination with a farm tractor or the like, a spring-tooth harrow implement comprising a frame having a forward end and a rearward end, means for supporting said frame for movement over the ground including wheel means disposed at said rearward end of said frame, at least one dual-ganged harrow unit mounted from said frame; said harrow unit including a first transversely disposed bar, a second transversely disposed bar arranged rearwardly of said first bar, a first gang of curved spring-teeth with the teeth thereof being transversely spaced and fixedly secured to said first bar, a second gang of curved spring-teeth with the teeth thereof being transversely spaced and fixedly secured to said second bar, said gang of spring-teeth of said first bar and said gang of spring-teeth of said second bar being staggered transversely, a pair of laterally disposed side members spaced transversely and extending longitudinally of said frame, said pair of side members including a right member and a left member with each member including a forward end portion and a rearward end portion, means securely attaching said first bar at the opposite end portions thereof respectively to said forward end portions of said right and said left side members and securely attaching said second bar at the opposite end portions thereof respectively to said rearward end portions of said right and said left side members, bearing means pivotally securing said pair of side members from said frame with the pivot axis thereof extending transversely of said frame and disposed substantially half-way between said first and said second bars, said bearing means including means providing limited forward and rearward movement of said pair of side members relative to said frame, and a pair of elongated link members pivotally secured at opposite end portions thereof respectively to said frame and the opposite end portions of said first bar, said pair of link members providing means for arresting the pivotal movement of said pair of side members and said first and said second gangs of spring-teeth.

7. The combination of claim 6 in which the means securly attaching said first bar and said second bar to said right and said left side members comprises means providing apertures respectively in said forward end portions and said rearward end portions of said right and said left side members, said oppositely disposed end portions respectively of said first bar and said second bar extending into said apertures for preventing torsional movement of said first and said second bars respectively relative to said right and said left side members, and fastening means for preventing axial movement of said first and said second bars respectively relative to said right and said left side members.

8. The combination of claim 6 in which said bearing means of said harrow implement comprises a right support and a left support with each support being fixedly secured respectively to said frame and disposed astraddle a respective side member, means providing a slotted aperture extending horizontally respectively in said right side member and said left side member, a pin secured to each support member and extending respectively through said slotted aperture of each said right side member and said left side member.

9. The combination of claim 6 in which is included spring means yieldably connecting said frame and said right and said left side members for stabilizing the pivotal movement of said first and said second gangs of spring-teeth.

10. The combination of claim 9 in which said spring means yieldably connecting said frame and said right and said left side members comprises a pair of coiled compression-type springs interposedly secured between said frame and each member of said right and said left side members, each of said right and said left side members having a coiled compression-type spring secured at said forward end and at said rearward end thereof, each said spring at said forward and said rearward ends of said right and said left side members being disposed vertically and being securely attached at the lower end thereof to the respective side member and being unattached and free at the upper end thereof, the forwardly disposed springs of said right and said left side members and the rearwardly disposed springs of said right and said left side members of said dual-ganged harrow units being adapted to counteract each other and to stabilize the pivotal movement of said first and said second gangs of spring-teeth.

11. The combination of claim 10 in which said wheel means of said harrow implement comprises a wheel disposed at said rearward end of said frame, support means movably supporting said frame relative to said wheel, and fluid-actuated power means for operably moving said frame relative to said wheel and for raising and lowering said dual-ganged harrow unit.

12. The combination of claim 11 in which is included a plurality of slots provided in said support means, a plurality of holes provided in said frame, and a substantially U-shaped rod means for engagement in a selected one of said slots and a selected one of said holes to fixedly secure said wheel relative to said frame.

13. In combination with a farm tractor or the like, a spring-tooth harrow implement comprising a frame having a forward end and a rearward end, means for supporting said frame for movement over the ground including wheel means disposed at said rearward end of said frame, at least one dual-ganged harrow unit mounted from said frame; said harrow unit including a first transversely disposed bar, a second transversely disposed bar arranged rearwardly of said first bar, a first gang of circularly arced spring-teeth with the teeth thereof being individually arranged and transversely spaced apart and fixedly secured to said first bar, a second gang of circularly arced spring-teeth with the teeth thereof being individually arranged and transversely spaced apart and fixedly secured to said second bar, said gang of teeth of said first bar and said gang of teeth of said second bar being staggered transversely relative to one another, a pair of laterally disposed side members spaced transversely and extending longitudinally of said frame, said pair of side members including a right member and a left member with each of said side members including a forward end portion and a rearward end portion; means securely attaching said first bar and said second bar respectively to said right and left side members comprising means providing apertures in said forward and said rearward end portions of said right and said left side members, said oppositely disposed end portions respectively of said first bar and said second bar extending through said apertures for preventing torsional movement of said first and said second bars respectively relative to said right and said left side members, and fastening means for preventing axial movement of said first and said second bars respectively relative to said right and said left side members; right and left supports respectively for said right and said left side members, each of said supports being fixedly secured to said frame and disposed astraddle a respective side member, a slotted aperture extending horizontally through each of said side members, a pin secured respectively to each of said support members and extending respectively through said slotted apertures in said right and said left side members, and right and left elongated link members pivotally secured respectively at opposite end portions thereof to said frame and said forward end portions of said right and said left side members.

References Cited by the Examiner

UNITED STATES PATENTS

| | | | |
|---|---|---|---|
| 1,357,841 | 10/1920 | Brownlie | 172—395 |
| 1,947,127 | 2/1934 | Dunham | 172—146 X |
| 2,729,929 | 1/1956 | Mason | 172—619 X |
| 2,925,870 | 2/1960 | Michelson et al. | 172—254 X |

FOREIGN PATENTS 209,121    1/1924    Great Britain.

ANTONIO F. GUIDA, *Acting Primary Examiner.*

J. R. OAKS, *Assistant Examiner.*